United States Patent
Ueda et al.

(10) Patent No.: US 6,323,999 B1
(45) Date of Patent: Nov. 27, 2001

(54) IMAGE DISPLAY APPARATUS

(75) Inventors: Hiroaki Ueda, Suita; Kenji Ishibashi, Izumi; Yasushi Kobayashi, Itami; Ichiro Kasai, Kawachinagano; Takeshi Endo, Osaka; Yasushi Tanijiri, Osakasayama, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/630,617

(22) Filed: Aug. 2, 2000

(30) Foreign Application Priority Data

Aug. 4, 1999 (JP) .................................................. 11-221017

(51) Int. Cl.[7] .......................... G03B 21/56; G03B 21/60; G03B 21/00; G03B 21/22; G02B 27/22

(52) U.S. Cl. .......................... 359/443; 359/449; 359/452; 359/479; 353/7; 353/74

(58) Field of Search .................... 359/443, 449, 359/460, 452, 453, 478, 479; 353/74, 77, 7, 10; 348/54, 59; 352/43

(56) References Cited

U.S. PATENT DOCUMENTS

| | | | |
|---|---|---|---|
| 3,200,702 | 8/1965 | Giordano | 88/24 |
| 5,191,449 | * 3/1993 | Newswanger | 359/22 |
| 5,193,015 | * 3/1993 | Shanks | 359/53 |
| 5,606,458 | 2/1997 | Fergason | 359/630 |
| 5,621,571 | 4/1997 | Bantli et al. | 359/529 |
| 5,621,572 | 4/1997 | Fergason | 359/630 |
| 5,703,717 | * 12/1997 | Ezra et al. | 359/462 |
| 5,909,325 | * 6/1999 | Kuba et al. | 359/834 |
| 5,959,777 | 9/1999 | Whitehead | 359/618 |
| 6,181,386 | * 1/2001 | Knox | 348/788 |
| 6,211,903 | * 4/2001 | Bullister | 348/14.16 |

FOREIGN PATENT DOCUMENTS 06-075303 A   3/1994   (JP) .

* cited by examiner

Primary Examiner—Russell Adams
Assistant Examiner—Magda Cruz
(74) Attorney, Agent, or Firm—Sidley Austin Brown & Wood

(57) ABSTRACT

An image display apparatus is provided with a screen having retro-reflectivity, a liquid crystal display device displaying an image, a projection optical system projecting the light of the liquid crystal display device onto the screen, and a beam magnifier located close to the screen and magnifying the light beams, included in the projected light, expressing individual points of the image. The beam magnifier is composed of a diffraction optical element or a diffusing plate, and magnifies each light beam so that the magnification is larger in the direction of the horizontal field of view than in the direction of the vertical field of view. When images having parallax are provided for the left and right eyes, an upper limit of the magnification of the light beams is set in consideration of the distance between the left and right eyes to prevent cross-talk.

11 Claims, 10 Drawing Sheets

IMAGE DISPLAY APPARATUS

This application is based on application No. H11-221017 filed in Japan on Aug. 4, 1999, the entire contents of which are hereby incorporated by reference.

BACKGROUND OF THE INVENTION

1. Field of the Invention

The present invention relates to an image display apparatus for displaying an image with a wide field of view, and is used in the field of providing images such as the field of virtual reality.

2. Description of the Prior Art

Recently, virtual reality providing imaginary images and enhancing the feeling of presence has become remarkably wide-spread, and image display apparatuses of various types have been developed for providing images with wide fields of view. As one of these image display apparatuses, there is an image display apparatus that projects an image, displayed on a display device, onto a screen with magnification of the image by a projection optical system. The apparatus can be used while being held by the observer's hands or mounted on the observer's head so that the screen is positioned in front of the observer's eyes. In this type of image display apparatus, it is necessary to apply light to the observer from all parts of the screen. Therefore, a screen having diffusive-reflectivity or retro-reflectivity is used.

In the case when a screen having diffusive-reflectivity is used, since the degree of light diffusion depends on the incident angle of light onto the screen, the quantity of light going from respective positions of the screen to the observer varies, so that the brightness of the image to be provided is apt to become uneven. In addition, since the projected light proceeds from the screen in all directions and the quantity of the light applied to the observer becomes small, it is inevitable that the brightness of the image observed is reduced. Furthermore, when images having parallax are provided to the left and right eyes to enhance the three-dimensional effect, a phenomenon that the light of the image for the left eye enters the right eye and the light for the right eye enters the left eye, that is, cross-talk arises. Therefore, it is necessary to provide special means for avoiding this.

On the other hand, if a screen having retro-reflectivity is used, light entering into any part of the screen is almost reflected toward each incident direction. Therefore, by projecting light from a direction of the observer's eyes toward the screen, it is possible to direct almost all of the projected light from any part of the screen to the observer's eyes. For this reason, it is possible to provide a bright image without uneven brightness and cross-talk. It is also possible to set the images for the left and right eyes to overlap each other on the screen.

However, in the screen having retro-reflectivity, the pupil diameter of the image provided for the observer, that is the diameter of the light beams expressing individual points of the image at the position of the eyes is defined by only the diameter of the exit pupil of a projection optical system and the distance between the screen and the eyes. Therefore, it is difficult to magnify the pupil diameter of the images for facilitating observation, and at the same time to miniaturize and lighten the apparatus so as to make the apparatus suitable to the mode of usage. For example, if the exit pupil of the projection optical system is made larger, the size and the weight of the projection optical system increase. If the distance between the eyes and screen is elongated, the apparatus inevitably becomes large.

In Japanese Laid-Open Patent Application No. H6-75303, a screen is proposed which is provided with a diffusing layer in front of a retro-reflective layer and has retro-reflectivity and diffusivity. If such a screen is used, the disadvantage of retro-reflectivity is compensated, since the light beams expressing individual points of an image are magnified by the diffusing layer. Therefore, it is expected that an image display apparatus which is small-sized and light-weight and provides an image with a large pupil diameter will be realized.

Man's field of view is large in the horizontal (left and right) direction and small in the vertical (up and down) direction. Nevertheless, in the screen described in the above-described patent application, the light beam is magnified isotropically by the diffusing layer. Hence, at least either excessive magnification in the vertical direction or insufficient magnification in the horizontal direction is caused. That is, if the light beam is magnified so as to meet the field of view in the horizontal direction, the image is excessively magnified beyond the field of view in the vertical direction. On the contrary, if the light beam is magnified so as to meet the field of view in the vertical direction, the image is insufficiently magnified below the field of view in the horizontal direction.

If the light beam is excessively magnified, the image provided becomes dark, and futile light without any probability of entering into eyes arises. If the light beam is insufficiently magnified, a situation arises where some part of the light expressing the image does not enter the eyes depending on the direction of the observer's eyes, i.e., the direction of line of sight. This causes eclipse, that is, partial dropouts of the image to be provided.

The phenomenon that the image to be provided becomes dark by excessive magnification of the light beam can be compensated by increasing the quantity of light in the display device displaying the image. However, doing so requires high performance of the display device itself or a light source illuminating the display device. Therefore, manufacturing cost of the apparatus is increased, and in addition, power consumption and running cost is also increased. Furthermore, when images with parallax are provided to the left and right eyes, excessive magnification of light beams results in cross-talk. In the screen described in the above-mentioned patent application, the extent to which the light beam is magnified by the diffusing layer is not considered.

SUMMARY OF THE INVENTION

In view of the above circumstances, an object of the present invention is to provide a small-sized and light-weight projection-type image display apparatus that displays on a screen a bright image free from eclipse and cross-talk.

In order to achieve the above-described object, according to one aspect of the present invention, an image display apparatus is provided with a screen having retro-reflectivity, an image display device displaying an image thereon, a projection optical system that projects light from the image display device and forms, on the screen, a magnified image of the image displayed on the image display device, and a beam magnifier located between the projection optical system and the screen so as to be close to the screen, the beam magnifier transmitting the light from the projection optical system, and magnifying light beams originating at individual points of the image display device and included in the light from the projection optical system, so that magnifications in two directions perpendicular to each other are different.

With the projection optical system, this image display apparatus forms on the screen a magnified image of the image displayed on the image display device and provides this magnified image to an observer. The screen has retro-reflectivity, and a beam magnifier transmitting the light from the projection optical system is located between the projection optical system and the screen. The observer can observe the image formed on the screen, by watching the screen through the beam magnifier from an angle of the light entering the screen from the projection optical system.

The beam magnifier magnifies the light beams, originating at individual points of the image display device and included in the light going from the projection optical system to the screen, and also magnifies the light beams reflected by the screen. Here, since the beam magnifier is located close to the screen, the light beams that pass through the beam magnifier and enter the screen are magnified only slightly. Therefore, the image formed on the screen is not blurred due to the magnifying action of the beam magnifier, and the image provided to the observer is sharp.

On the other hand, the light reflected from the screen increases the magnification by passing through the beam magnifier again, and reaches the observer's eyes as being magnified. Owing to this, the diameter of the light beams expressing individual points of the image provided to the observer increases.

Magnification of the beam magnifier is different in two directions perpendicular to each other, and hence the light beams from individual points of the image display device are anisotropically magnified. It is possible to make the degrees of magnification of the light beams coincide with the size of the fields of view in the horizontal and vertical directions by making the direction with the larger magnification and the direction with the smaller magnification correspond, respectively, to the direction of the horizontal field of view and the direction of the vertical field of view of the observer. This makes it possible to avoid both the decrease of light quantity caused by excessive magnification of the light beams and the eclipse of the image caused by insufficient magnification. Therefore, it is possible to provide a bright and quality-enhanced image.

The beam magnifier may magnify the light beams from individual points of the image display device in only one direction. Alternatively, the beam magnifier may magnify the light beams from individual points of the image display device in both of the two directions perpendicular to each other, so long as the magnification is different in the two directions.

The beam magnifier can be a diffracting element that separates and magnifies a light beam by diffraction. When the diffracting element is used as the beam magnifier, it becomes possible to arbitrarily select diffraction orders, diffraction angles, and diffraction intensities, through the setting of diffraction conditions. Owing to this, it is possible to arbitrarily set the degree of magnification of the light beams and the intensity distribution of the light beams after magnification. It becomes possible to make the brightness of the image constant regardless of the direction of eyes by making the intensity of the light beams after magnification substantially uniform from the central part to the periphery within the image.

In order to achieve the above-described object, according to another aspect of the present invention, an image display apparatus is provided with a screen having retro-reflectivity, a pair of image display devices displaying an image for a left eye and an image for a right eye respectively, a pair of projection optical systems that project light from the image display devices and form, on the screen, magnified images of the images displayed on the image display devices, and a beam magnifier located between the projection optical systems and the screen so as to be close to the screen, the beam magnifier transmitting the light from the projection optical systems, and magnifying light beams originating at individual points of the image display devices and included in the light from the projection optical systems. In addition, the image display apparatus fulfills the relation of Expression (1).

$$2 \cdot r \sin(\theta/2) \leq D \leq 2 \cdot \{W - r \sin(\theta/2)\} \tag{1}$$

Here, r is a distance between centers of rotation and pupils of observer's left and right eyes, θ is an observer's horizontal viewing angle, W is a distance between the left and right eyes, and D is a width of the light beams originating at individual points of the image display devices at the left and right eyes in a direction parallel to a line connecting the left and right eyes.

This image display apparatus displays an image for the left eye and an image for the right eye separately and projects the images onto a screen having retro-reflectivity. The image display apparatus is used, for example, for providing a three-dimensional image by displaying two images having parallax. A beam magnifier transmitting the light from the projection optical systems is located between the projection optical systems and the screen. The observer can observe the images formed on the screen, by watching the screen through the beam magnifier from an angle of the light entering the screen from the projection optical systems.

The beam magnifier magnifies the light beams, originating at individual points of the image display devices and included in the light going from the projection optical systems to the screen, and also magnifies the light beams reflected by the screen. Since the beam magnifier is located close to the screen, it is possible to form sharp images on the screen, and at the same time, to increase the diameter of the light beams from individual points constituting the images, as described previously.

In Expression (1), symbol D denotes the width of the magnified light beams directed to the eyes of the observer, along the direction of both eyes separately. If this value is too small, eclipse arises in the images provided, and if the value is too large, cross-talk arises. The left side the Expression (1) denotes the length of the chord of the eyeball that corresponds to the observer's viewing angle in the horizontal direction. Therefore, if the width D of the light beams is equal to or greater than a value of the left side, the observer's pupil is included inside the light beams even if the observer turns the eyes in any direction within the viewing angle. The right side of the Expression (1) denotes the length of subtracting the above-described length of the chord from two times as large as the distance between the left and right eyes. Therefore, if the width D of the light beam is equal to or less than a value of the right side, the pupil of the other eye is never included in the light beams expressing the image provided to one eye.

In this image display apparatus, a lower limit of the width of the light beams after magnification is determined so that left and right pupils are surely included in the light beams constituting the images provided for the left and right eyes respectively. Therefore, there is no eclipse in the images provided. In addition, although the light of the image for the left eye and the light of the image for the right eye is projected on the same screen, no cross-talk arises, since the light of both images is separated by the retro-reflectivity of the screen, and at the same time, the separation is secured by determining an upper limit of magnification of the light beams.

In each image display apparatus described above, it is possible to make the beam magnifier magnify the light beams so that a magnification of light beams originating at a peripheral part of the image display device is larger than a magnification of light beams originating at a central part of the image display device. Although the eclipse is apt to arise in a periphery of an image, owing to this, it becomes easy to set a condition to prevent the eclipse, for example, to fulfill the relation of the left inequality in Expression (1).

A combiner for leading the light from the projection optical system to the screen and leading the light from the screen to the observer's eyes may be provided. In this configuration, either an optical path from the projection optical system to the screen or an optical path from the screen to the observer's eyes is partly folded. Therefore, it is possible to locate the projection optical system in a position equivalent to the observer's eye or vicinity thereof, so that centers of the respective light beams expressing individual points of the image pass through the observer's eye. As a result, it becomes easy to set the magnification of the beam magnifier so as to prevent loss of light, eclipse, and cross-talk from arising.

Moreover, an eyepiece optical system may be provided for directing light from the screen to the observer's eye, and supplying the observer with virtual image of the image formed on the screen. Since it becomes possible to further magnify the image on the screen by the eyepiece optical system, it is possible to further widen the field of view of the image provided, and to further miniaturize the apparatus.

BRIEF DESCRIPTION OF THE DRAWINGS

The above-described and other objects and features of the present invention will become clear from the following description, taken in conjunction with the preferred embodiments with reference to the accompanied drawings in which.

DESCRIPTION OF THE PREFERRED EMBODIMENTS

Figure 1:
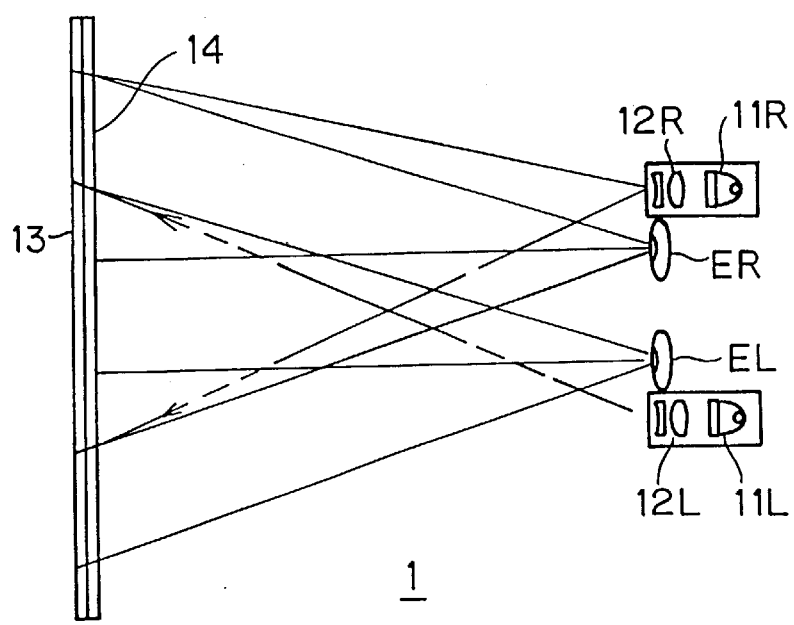
FIG. 1 is a plan view of an image display apparatus of a first embodiment.

Hereinafter, image display apparatuses of the present invention will be described with reference to the drawings. The configuration of an image display apparatus 1 of a first embodiment is shown in FIG. 1. FIG. 1 is a plan view of the image display apparatus 1. The image display apparatus 1 includes a pair of liquid crystal display units 11L and 11R, a pair of projection optical systems 12L and 12R, a screen 13, and a diffraction optical element 14.

Each of the liquid crystal display units 11L and 11R is transmissive, displays a two-dimensional image on a liquid crystal panel, modulates light from a backlight source by the image displayed, and emits the modulated light. The liquid crystal display units 11L and 11R display images that are provided for observer's left and right eyes EL and ER, respectively. It is possible to provide an image with a highly three-dimensional effect by making the two images, displayed on the liquid crystal display units 11L and 11R, have parallax.

The projection optical systems 12L and 12R project the light emitted from the liquid crystal display units 11L and 11R to the screen 13, and form images on the screen 13. The images formed on the screen 13 are magnified images of those displayed on the liquid crystal display units 11L and 11R, and have wide ranges. The projection optical system 12L is located in a position where its exit pupil is at the same level as the observer's left eye EL and close to the left eye EL. Similarly, the projection optical system 12R is located in a position where its exit pupil is at the same level as the observer's right eye ER and close to the right eye ER. The observer observes images on the screen 13 from an incident angle of light onto the screen 13.

Optical axes of the projection optical systems 12L and 12R are parallel to each other, and the screen 13 is located perpendicularly to the optical axes of the projection optical systems 12L and 12R. The images for the left and right eyes formed on the screen 13 partially overlap each other.

The screen 13 has retro-reflectivity, and reflects almost all incident light in its incident direction. The light projected from the projection optical systems 12L and 12R is reflected toward the projection optical systems 12L and 12R, respectively. Therefore, the light of the images for the left and right eyes that overlap each other on the screen 13 is separated at the observer's position.

The diffraction optical element 14 is a holographic optical element, and is located very close to or in contact with a reflecting surface of the screen 13. The diffraction optical element 14 transmits the light from the projection optical systems 12L and 12R, and diffracts the light so that each of light beams included therein and originating at individual points of the images on the liquid crystal display units 11L and 11R is magnified.

Figure 2:
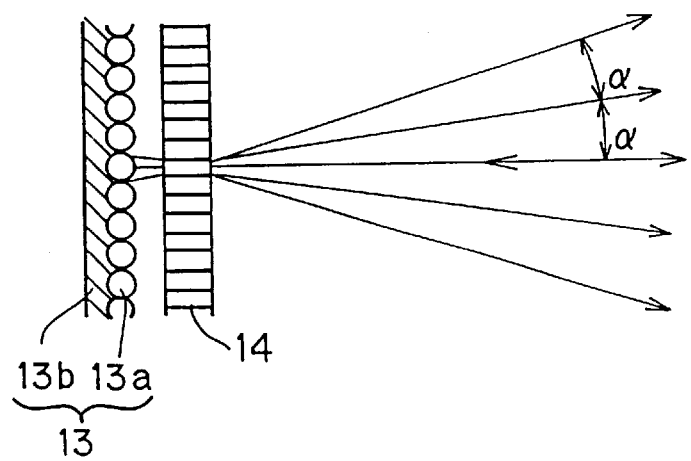
FIG. 2 is an enlarged plan view of a screen and a diffraction optical element in the image display apparatus of the first embodiment.

FIG. 2 is an enlarged partial view of the screen 13 and diffraction optical element 14. The screen 13 is produced by arranging minute glass beads 13a, having a diameter of 10 μm or less respectively, on a plane and providing a reflective film 13b on the back thereof. Light entering into each bead 13a is refracted at the front surface thereof and reaches the back surface, and is reflected by the reflective film 13b. The light reflected by the reflective film 13b is refracted again at the front surface, and proceeds in an optical path parallel to the incident light and separated from the incident light by a minute distance equal to or smaller than the diameter of the glass bead 13a. Owing to this, retro-reflectivity is realized.

The diffraction optical element 14 is set so as to generate one-dimensional diffraction. The direction of the diffraction by the diffraction optical element 14 is the direction of the left and right eyes EL, ER separating, that is, the direction of the observer's horizontal field of view. By exemplifying a case that the diffraction optical element 14 generates three diffracted rays, that is, minus one-order, zero-order, and plus one-order diffracted rays, magnification of the light beams will be described.

The light beams, included in the light from the projection optical systems 12L and 12R, from individual points of the images on the liquid crystal display units 11L and 11R each enter the screen 13 as three light beams by passing through the diffraction optical element 14. These three light beams are retro-reflected by the screen 13, pass through the same part of the diffraction optical element 14, and become three light beams, respectively. Since diffraction angles α of the plus and minus one-order diffracted light are the same in outward and homeward travels, some of the light beams having passed twice through the diffraction optical element 14 coincide with one another in their traveling directions. In consequence, the number of the light beams expressing one point in the image becomes five.

Figure 3:
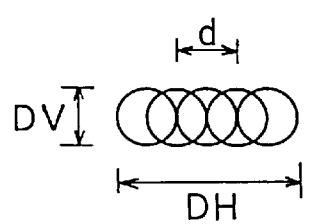
FIG. 3 is a cross-sectional view of light beams, expressing a point in an image, in a position of a projection optical system in the image display apparatus of the first embodiment.

FIG. 3 shows an example of a cross-section of the light beams, which originate at the same point of the image of the liquid crystal display unit 11L or 11R and are reflected by the screen 13, in the position of the projection optical systems 12L or 12R. The width DV of the light beams in the direction of the observer's vertical field of view (hereinafter, a vertical direction) is the same as the diameter d of the exit pupil of the projection optical systems 12L and 12R. However, the width DH of the light beams in the direction of the observer's horizontal field of view (hereinafter, a horizontal direction) is larger than the diameter d of the exit pupil. Thus, the light beam is anisotropically magnified by the diffraction optical element 14. In this example, since the light beams are made to be shifted by a distance nearly equal to the radius thereof, the light beams adjoining to each other overlap with each other.

The central light beam among the five light beams expressing the same point of the image goes to the exit pupil of the projection optical system 12L or 12R. Two light beams that are inner ones for the observer become light beams providing images for the eyes EL and ER. By increasing the width DH of the light beams in the horizontal direction, it is easy to provide images without eclipse in left and right edges. In addition, by making the diameter d of the exit pupils of the projection optical systems 12L and 12R be a value corresponding to the vertical field of view, it is possible to provide images without eclipse in the upper and lower edges.

Since the diffraction optical element 14 is very close to the screen 13, image-forming positions, on the screen 13, of the three light beams going from the diffraction optical element 14 to the screen 13 are extremely close to one another, and substantially the same. Therefore, it never arises that the image formed on the screen 13 becomes blurry, and also that the sharpness of the image provided for the observer is lowered.

It is possible to arbitrarily set the diffraction conditions of the diffraction optical element 14, that is, order of diffraction and angle of diffraction of diffracted light and intensity ratio among diffracted light. Therefore, the width DH of the light beams in the horizontal direction, which depends on the angle of diffraction, and the intensity distribution of the light beams, which depends on the intensity ratio of the diffracted light, can be set very flexibly.

For example, if the diffraction optical element 14 is so set that the three diffracted light rays of zero-order, and plus and minus one-order have the same intensity, the intensity ratio of the five light beams expressing a point of the image becomes symmetrical in regard to the central light beam, the intensity ratio being 3:2:1 in view from the center to the outside. If the diffraction optical element 14 is so set that the intensity ratio of the plus and minus one-order diffracted light rays to the zero-order diffracted light ray is 2:1, the intensity ratio of the five light beams expressing a point of the image becomes 9:4:4 in view from the center to the outside. In the latter setting, it is possible to make the intensity of the two inner light beams providing the images for the eyes EL and ER equal.

Although the example that the diffraction optical element 14 generates three rays of diffracted light is described for easy comprehension, the diffraction conditions of the diffraction optical element 14 may be set in other ways. In particular, the more diffracted light rays there are, the more it is preferable. This is because it is possible to make the intensity distribution more uniform by increasing the overlap of light beams expressing the same point of the image. If the intensity distribution is uniform, the quantity of light that expresses the same point and enters the eyes EL and ER becomes constant even if the eyes EL and ER are turned to any angles, and hence the brightness of the image never changes.

Figure 4:
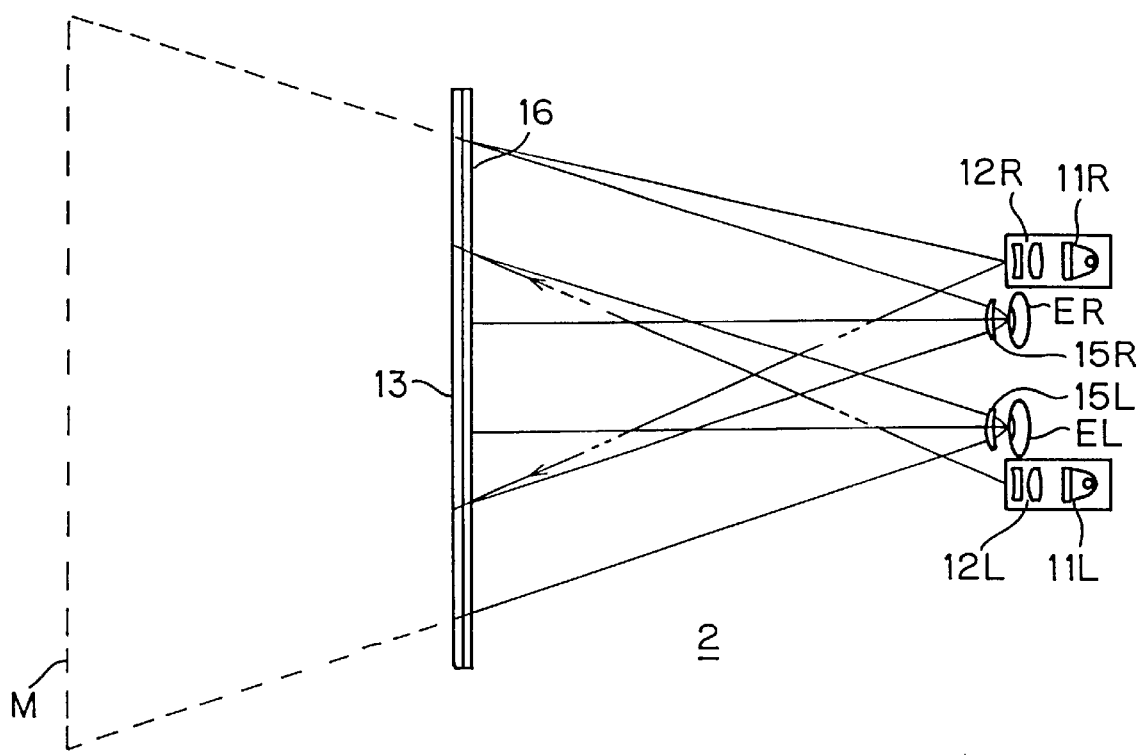
FIG. 4 is a plan view of an image display apparatus of a second embodiment.

FIG. 4 shows the configuration of an image display apparatus 2 of a second embodiment. FIG. 4 is a plan view of the image display apparatus 2. The image display apparatus 2 is configured by adding a pair of eyepiece optical systems 15L and 15R to the image display apparatus 1, and further includes a diffusing plate 16 instead of the diffraction optical element 14. Since other components are the same as those in the image display apparatus 1, duplicated description will be omitted.

The light from the screen 13 that enters the observer's eyes EL and ER becomes equivalent to light coming from a plane M farther than the screen 13 due to the positive power of the eyepiece optical systems 15L and 15R. Therefore, the observer observes a virtual image that is magnified and is positioned on the plane M. Hence the image display apparatus 2 can provide images with a field of view that is wider than that in the image display apparatus 1. In addition, if the fields of view are set nearly equal, the image display apparatus 2 becomes smaller than the image display apparatus 1.

The diffusing plate 16 is located very close to or in contact with the reflecting surface of the screen 13. The diffusing plate 16 transmits the light from the projection optical systems 12L and 12R, and magnifies the light beams originating at individual points of the images on the liquid crystal display units 11L and 11R by diffusing them.

Figure 5:
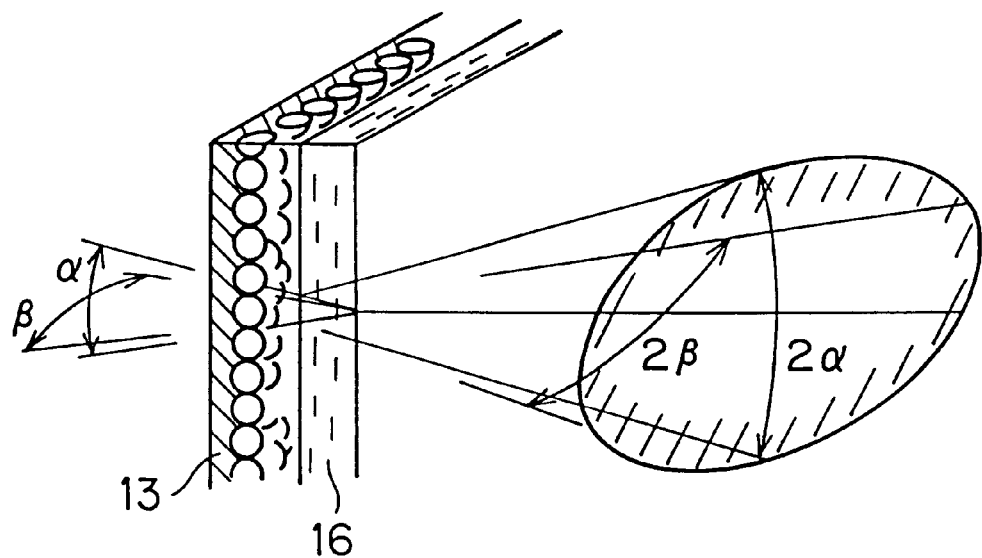
FIG. 5 is an enlarged perspective view of a screen and a diffusing plate in the image display apparatus of the second embodiment.

FIG. 5 shows an enlarged partial view of the screen 13 and the diffusing plate 16. The diffusing plate 16 has such anisotropic diffusion that degrees of diffusion are different in two directions that are perpendicular to each other, and is located so that light is diffused more in the horizontal direction than in the vertical direction. The light beams included in the light from the projection optical systems 12L and 12R and expressing individual points of the image are diffused by the diffusing plate 16 at an angle of diffusion $\alpha$ in the vertical direction and at an angle of diffusion $\beta$ in the horizontal direction ($\alpha<\beta$), and enter the screen 13 as light beams each having an elliptic cross-section.

The light beams retro-reflected by the screen 13 passes through the same part of the diffusing plate 16 and are diffused again. Therefore, the angle of diffusion of the light beams in the vertical direction after passing through the diffusing plate 16 twice becomes $2\alpha$, and the angle of diffusion in the horizontal direction becomes $2\beta$. In addition, since the diffusing plate 16 is very close to the screen 13, as already described, the image formed on the screen 13 is never blurry.

Figure 6:
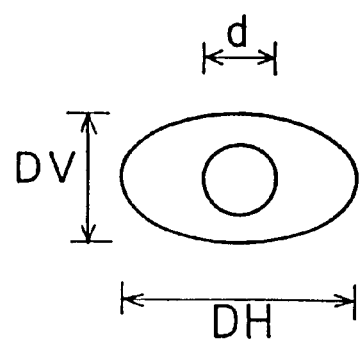
FIG. 6 is a cross-sectional view of a light beam, expressing pressing a point in an image, in a position of a projection optical system in the image display apparatus of the second embodiment.

FIG. 6 shows the cross-section of one of the light beams expressing individual points of the images on the liquid crystal display units 11L and 11R and reflected by the screen 13, in the position of the projection optical system 12L or 12R. The width DV of the light beam in the vertical direction and the width DH in the horizontal direction are larger than the diameter d of the exit pupils of the projection optical systems 12L and 12R. However, the light beam is magnified further largely in the horizontal direction.

It is easy to provide images without eclipse in left and right edges by making the width DH of the light beams in the horizontal direction large. It is also easy to provide images without eclipse in upper and lower edges by making the width DV of the light beam in the vertical direction be a size corresponding to the vertical field of view. Since the light beam is magnified also in the vertical direction, unlike in the image display apparatus 1, it is possible to use, as the projection optical systems 12L and 12R, small-sized and light-weight projection optical systems having a smaller exit pupil diameter d, in the image display apparatus 2.

Figure 7:
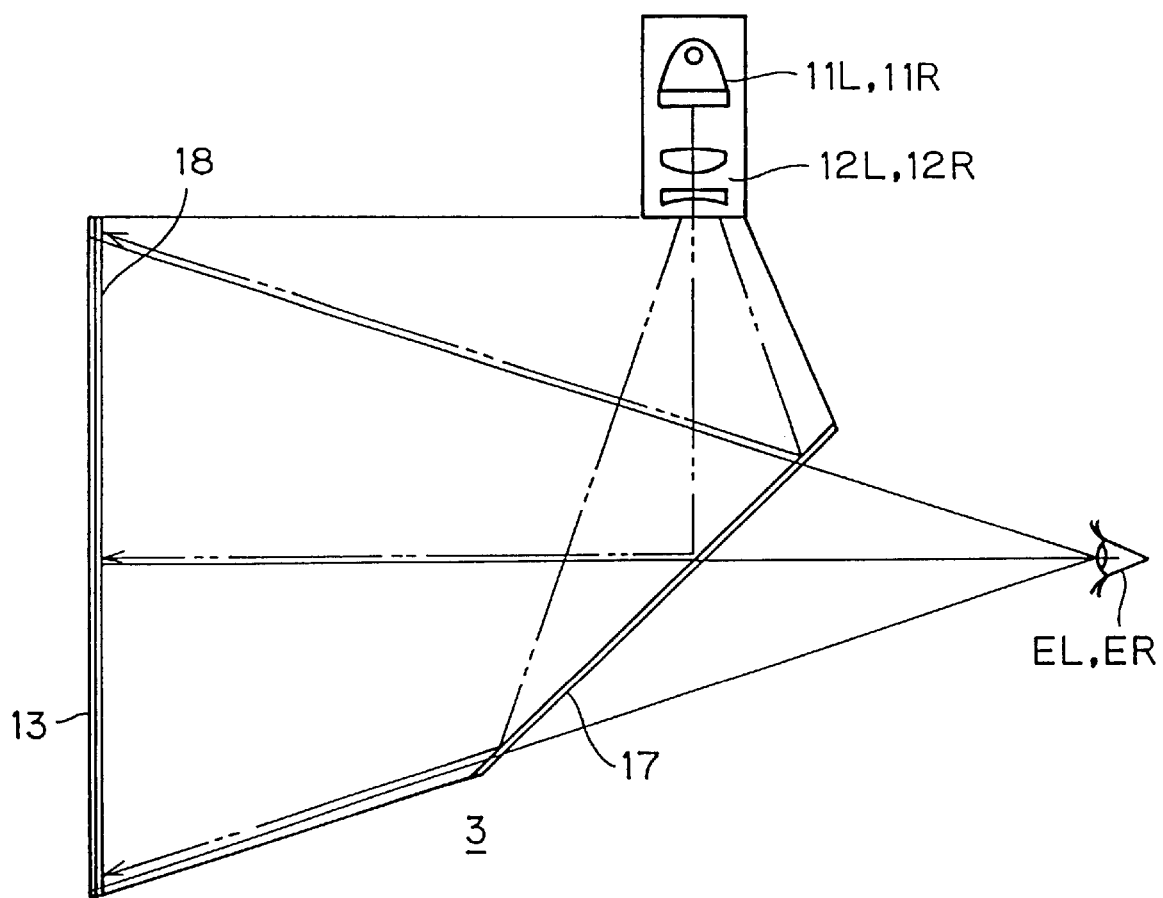
FIG. 7 is a side view of an image display apparatus of a third embodiment.

FIG. 7 shows the configuration of an image display apparatus 3 of a third embodiment. FIG. 7 is a side view of the image display apparatus 3. The image display apparatus 3 is configured with adding a half mirror 17 to the image display apparatus 1, changing positions of the liquid crystal display units 11L and 11R, and the projection optical systems 12L and 12R, and substituting another diffraction optical element 18 for the diffraction optical element 14.

The half mirror 17 is located between the observer's eyes EL and ER and the screen 13, and is inclined at 45° with respect to the screen 13. The projection optical systems 12L and 12R are located so that their optical axes are parallel to each other and intersect at an angle of 45° with the half mirror 17. The half mirror 17 functions as a combiner that leads the light projected by the projection optical systems 12L and 12R to the screen 13 by reflecting the light, and leads the light reflected by the screen 13 to the observer's eyes EL and ER by transmitting the light. It is also good enough to change positions and orientations of the respective components so that the half mirror 17 leads the light from the projection optical systems 12L and 12R to the screen 13 by transmitting the light, and leads the light from the screen 13 to the eyes EL and ER by reflecting the light.

The projection optical systems 12L and 12R are located in positions symmetrical to the observer's eyes EL and ER in regard to the half mirror 17, respectively. The optical axes of the projection optical systems 12L and 12R pass through centers of the eyes EL and ER respectively, and exit pupils thereof are located in positions optically equivalent to the eyes EL and ER.

Figure 8:
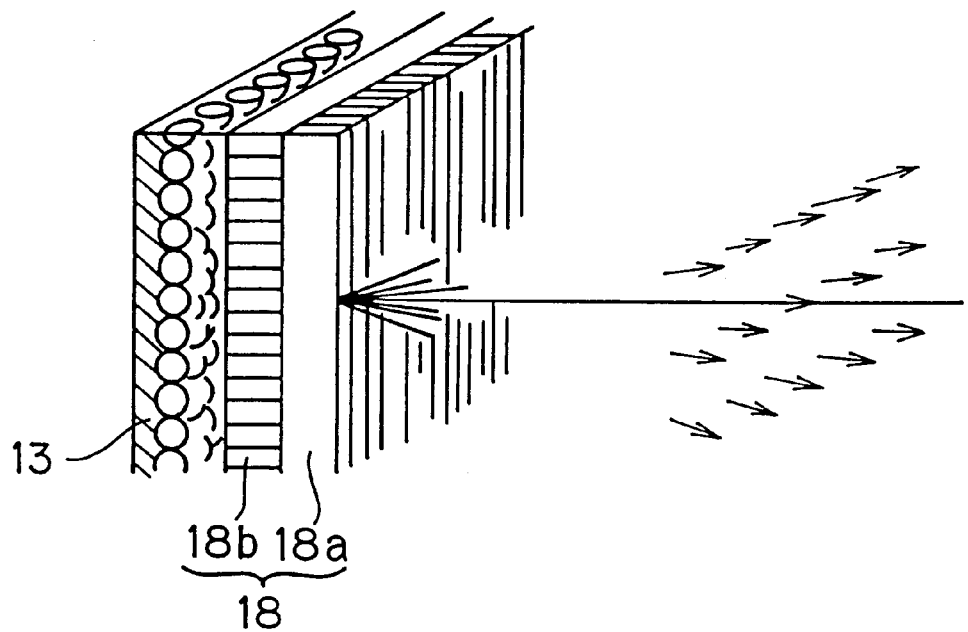
FIG. 8 is an enlarged perspective view of a screen and a diffraction optical element in the image display apparatus of the third embodiment.

FIG. 8 shows an enlarged partial view of the screen 13 and the diffraction optical element 18. The diffraction optical element 18 transmits the light from the projection optical systems 12L and 12R, and magnifies the included light beams originating at individual points of the images on the liquid crystal display units 11L and 11R by diffraction. The diffraction optical element 18 is configured by bonding two diffracting elements 18a and 18b, and is located very close to or in contact with the reflecting surface of the screen 13. The diffracting elements 18a and 18b are set so as to generate one-order of diffraction, respectively. Furthermore, the diffracting elements 18a and 18b are arranged so that the former generates the diffraction in the horizontal direction and the latter generates the diffraction in the vertical direction. Therefore, the diffraction as the entire diffraction optical element 18 becomes two-dimensional.

Setting of diffraction conditions of the diffracting elements 18a and 18b is different, and a light beam is magnified more in the horizontal direction than in the vertical direction. With exemplifying a case that the diffracting element 18a generates minus one-order, zero-order, and plus one-order, that is, three rays of diffracted light, the diffracting element 18b generates minus one-order, and plus one-order, that is, two rays of diffracted light, and the angles of diffraction of the plus and minus one-order rays of the two are equal, magnification of the light beam will be described.

The diffraction in the horizontal direction by the diffracting element 18a, as described in the first embodiment, finally generates five light beams from each of the light beams originating at individual points of the images on the liquid crystal display units 11L and 11R. The diffraction in the vertical direction by the diffracting element 18b first generates two light beams from each of the light beams originating at individual points of the images, and then generates two light beams from each of the generated light beams. Since the two light beams among the four light beams coincide in traveling directions, these four light beams finally become three light beams. In consequence, the light beam expressing a point of the images is made by the diffraction optical element 18 to totally be fifteen light beams composed of five light beams in the horizontal direction by three light beams in the vertical direction.

Figure 9:
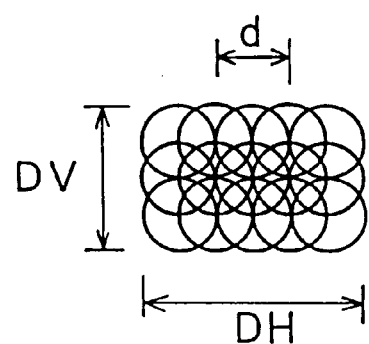
FIG. 9 is a cross-sectional view of light beams, expressing a point in an image, in a position of an observer's eye in the image display apparatus of the third embodiment.

FIG. 9 shows an example of a cross-section of the light beams, coming from the same point of the images, in the position of the observer's eyes EL and ER. Here, since each light beam separates from an adjacent light beam by a distance nearly equal to their radius, adjacent light beams overlap with each other. The width DV of the light beam in the vertical direction and the width DH in the horizontal direction are both larger than the diameter d of the exit pupils of the projection optical systems 12L and 12R, and the light beam is magnified more largely in the horizontal direction.

Since the optical axes of the projection optical systems 12L and 12R pass through centers of the eyes EL and ER, respectively, it is possible to use the five light beams in the horizontal direction as light for providing images for the eyes EL and ER, unlike in the image display apparatus 1 of the first embodiment. Therefore, it is possible to make the entire width DH of the light beam in the horizontal direction correspond to the horizontal field of view. In consequence, in the image display apparatus 3, it is possible to make light having no possibility of entering the observer's eyes EL and ER be never present. As a result, not only there is no eclipse in the left and right directions and the upper and lower directions, but also it is possible to provide brighter images.

Diffraction conditions of the diffraction optical element 18 can be arbitrarily set. For example, exemplified setting of including the same diffraction orders in the diffracted light by the diffracting elements 18a and 18b and making diffraction angles of them equal is not indispensable. In addition, as described previously, it is preferable to make the intensity distribution of the light beams expressing the same point of the image uniform by increasing the number of diffracted light rays and degrees of overlap. By doing so, it is possible to prevent the fluctuation of brightness of images according to the direction of line of sight.

Figure 10:
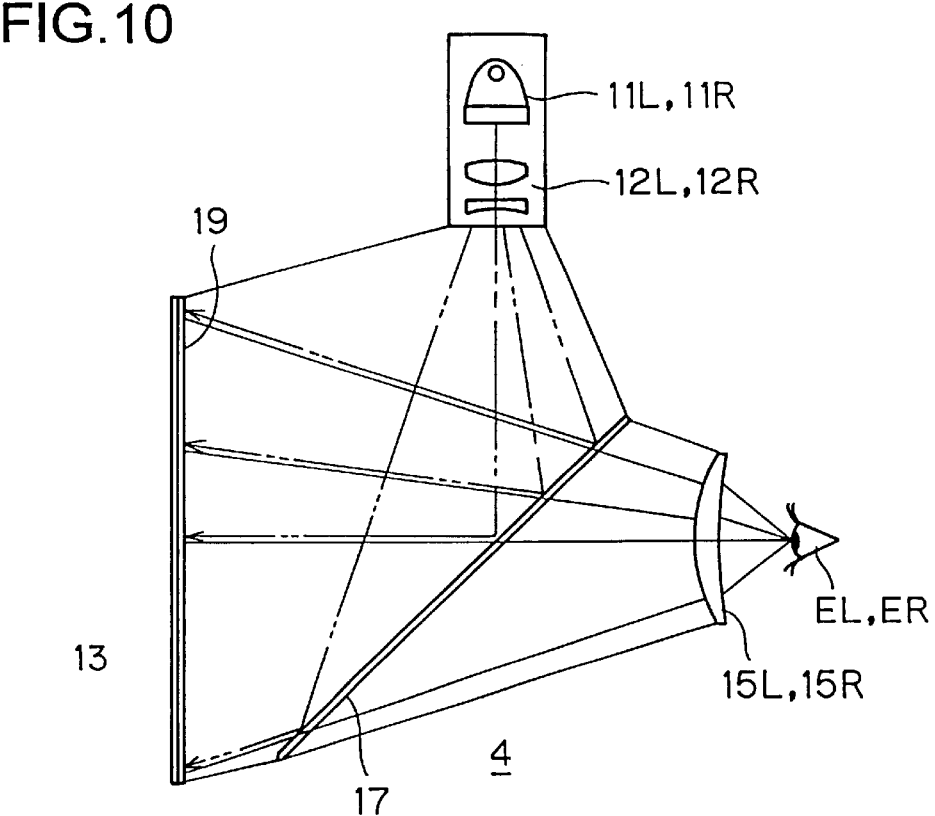
FIG. 10 is a side view of an image display apparatus of a fourth embodiment.
Figure 11:
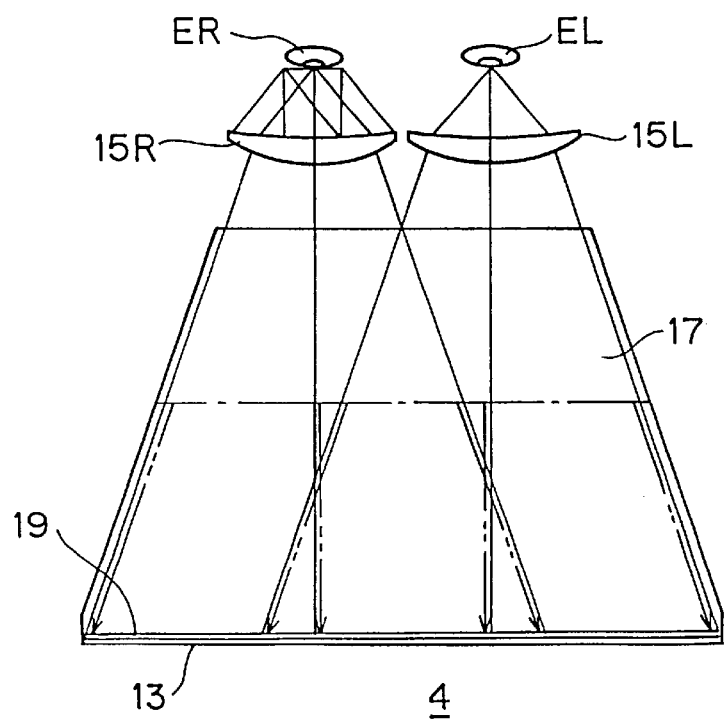
FIG. 11 is a plan view of the image display apparatus of the fourth embodiment.
Figure 12:
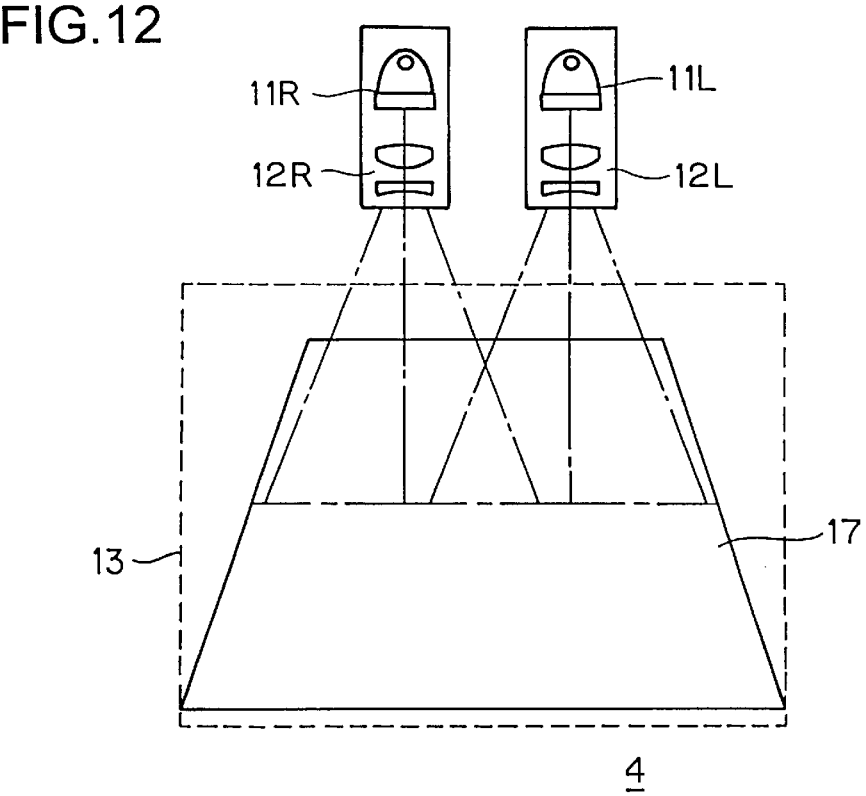
FIG. 12 is a front view of the image display apparatus of the fourth embodiment.

FIGS. 10 to 12 show the configuration of an image display apparatus 4 of a fourth embodiment. These drawings are a side view, a plan view, and a front view, respectively. The image display apparatus 4 is configured with adding the eyepiece optical systems 15L and 15R to the image display apparatus 3 and including a diffusing plate 19 instead of the diffraction optical element 18. Owing to provision of the eyepiece optical systems 15L and 15R, the observer observes magnified virtual images positioned farther than the screen 13.

Figure 13:
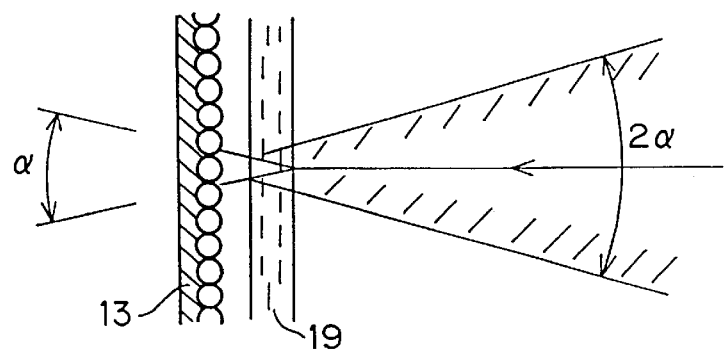
FIG. 13 is an enlarged plan view of a screen and a diffusing plate in the image display apparatus of the fourth embodiment.
Figure 14:
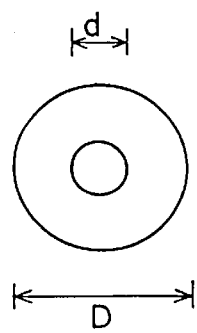
FIG. 14 is a cross-sectional view of a light beam, expressing a point in an image, in a position of an observer's eye in the image display apparatus of the fourth embodiment.

FIG. 13 shows an enlarged partial view of the screen 13 and the diffusing plate 19. The diffusing plate 19 is located close to or in contact with the screen 13. The diffusing plate 19 transmits the light from the projection optical systems 12L and 12R, and magnifies the included light beams originating at individual points of the images on the liquid crystal display units 11L and 11R by diffusion. The diffusion of the diffusing plate 19 is isotropic, and the light beams are magnified at the same rate in the horizontal and vertical directions. The light beam is diffused twice as large as the angle of diffusion α of the diffusing plate 19 by passing through the diffusing plate 19 twice. FIG. 14 shows a cross-section of the light beam in the position of the observer's eyes EL and ER. The width D of the light beam is the same in any direction.

Figure 15:
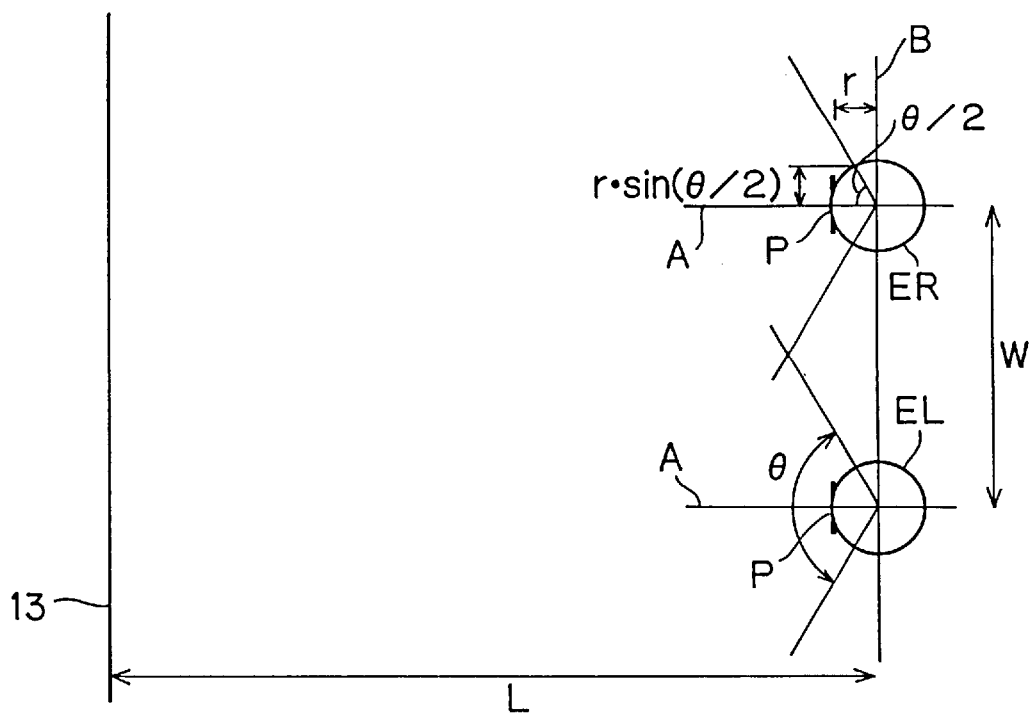
FIG. 15 is a schematic diagram showing a principle of setting the width of the light beams, expressing individual points of an image, in the image display apparatus of the fourth embodiment.

In the image display apparatus 4, the width D of the light beam and the angle of diffusion α are determined so as to surely prevent the eclipse and cross-talk at the same time. Setting of the width D of the light beams each expressing a point of an image in the image display apparatus 4 will be described with reference to FIG. 15. In FIG. 15, the reference symbol A denotes the central axes of the eyes EL and ER, the symbol B denotes a straight line connecting the center of rotation of the left eye EL to the center of rotation of the right eye ER, the symbol P denotes the pupils of the eyes EL and ER, the symbol r denotes the distance from the center of rotation to the pupil P, the symbol θ denotes the horizontal viewing angle, and the symbol W denotes a gap between the left and right eyes EL and ER, that is, the distance between the centers of rotation.

The width, in the directions of line B, of the positional range that the pupil P can take on within the horizontal viewing angle is the length of a chord of the eye ball corresponding to the horizontal viewing angle, $2 \cdot r \cdot \sin(\theta/2)$. If the width, in the directions of line B, of the light beam in the position of the eyes EL and ER is equal to or greater than the value of the above expression, the pupil P is always contained inside the light beam regardless of the direction of the eyes EL and ER, and eclipse does not arise at all.

The distance, in the direction of line B, between the center of rotation of one eye and the pupil P of the other eye at the time of the pupil P of the other eye mostly accessing the one eye within the horizontal viewing angle is $W - r \cdot \sin(\theta/2)$. If a half of the width, in the direction of line B, of the light beam in the position of the eyes EL and ER is equal to or smaller than the value of this expression, the pupil P of the other eye does not enter the light beam to be given to the one eye, and cross-talk does not arise at all.

Therefore, so long as the width D of the light beam in the direction of line B in the position of the observer's eyes EL and ER fulfills Expression (1), no eclipse nor cross-talk arises. The image display apparatus 4 is set so as to fulfill this relation. Here, Expression (1) is described again.

$$2 \cdot r \cdot \sin(\theta/2) \leq D \leq 2 \cdot \{W - r \cdot \sin(\theta/2)\} \tag{1}$$

When the distance r between the center of rotation and the pupil, the horizontal viewing angle θ, and the distance W between the left and right eyes in Expression (1) are replaced respectively with 9 mm, 120°, and 60 mm, which are typical values for an adult, Expression (2) is obtained.

$$16 \text{ mm} \leq D \leq 104 \text{ mm} \tag{2}$$

On the other hand, the width D of the light beam is approximated to a value obtained by multiplying a tangent of the diffusion angle α of the diffusing plate 19 by the distance L between the screen 13 and the eyes EL and ER, multiplying the result by two, and then adding to the result the diameter d of the exit pupils of the projection optical systems 12L and 12R. Therefore, the width D is determined as Expression (3).

$$D \approx d + 2 \cdot L \cdot \tan \alpha \tag{3}$$

In a practical example of the setting of the image display apparatus 4, the diameter d of the exit pupils of the projection optical systems 12L and 12R is 2 mm, the distance L between the screen 13 and the eyes EL and ER is 150 mm, and the angle of diffusion α of the diffusing plate 19 is set within a range of Expression (4) so as to fulfill Expression (2).

$$3° \leq \alpha \leq 18° \tag{4}$$

The relation of the right inequality in Expression (4) secures the prevention of cross-talk. However, as the angle of diffusion α increases, the brightness of the image to be provided decreases, and light that has no probability of entering the observer's eyes EL and ER increases. Therefore, the angle of diffusion α is set to about 3°, so that the light is used efficiently and brighter images are provided.

In this embodiment, the magnification of the light beam is made the same in the horizontal and vertical directions by employing the isotropic diffusing plate 19. However, as described in the first to third embodiments, the magnification in the horizontal direction may be larger than the magnification in the vertical direction. Moreover, it is also good enough to magnify the light beam by a diffraction optical element instead of the diffusing plate 19.

So long as the width D of the light beams from all points of an image is within the range of Expression (1), it is not necessary to make the width D constant. That is, it is also possible to vary the width D of the light beam in accordance with the part in the image where the light beam originates. Although eclipse arises more easily in the peripheral part of an image than in the central part, it is easy to set conditions for preventing eclipse by magnifying the light beams expressing individual points in the peripheral part more than the light beams expressing individual points in the central part.

When the magnification of the light beam is varied according to the part in the image, it may be changed either continuously or in increments. If the light beam is magnified with a diffusing plate, it is possible to continuously change the magnification by continuously increasing the diffusion angles α from the central part to the peripheral part, and it is possible to change the magnification in increments by making the diffusion angle α constant every predetermined range.

If the light beam is magnified with a diffraction optical element, the same result can be obtained by changing continuously or in increments the angle of diffraction of the light ray with the same order. In addition, the magnification can be also changed in increments by changing the number of diffracted light rays to be taken out. For example, zero-order, and plus/minus one-order of diffraction is generated for the central part of the image, and zero-order, plus/minus one-order, and plus/minus two-order of diffraction is generated for the peripheral part.

It is applicable to not only the image display apparatus 4 but also the image display apparatuses 1 to 3 of the first to third embodiments to make the magnification in the periphery larger than the magnification in the central part. Increase in the magnification might cause decrease in the brightness of the image. However, even if the brightness in the periphery, which is not the main observation object, is decreased a little, the influence on image quality is little.

Figure 16A:
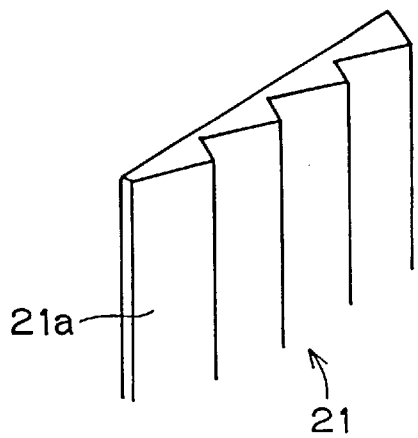
FIGS. 16A and 16B are perspective views of prism arrays substituted for magnifying the light beams in the image display apparatus of each embodiment.
Figure 16B:
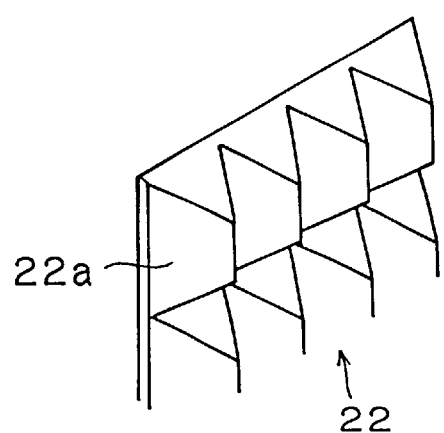

In each of the above-described embodiments, although a diffraction optical element or a diffusing plate is used as the beam magnifier for magnifying the light beams, a prism array can be also used as the beam magnifier. FIGS. 16A and 16B show examples of prism arrays for magnifying light beams. The prism array 21 shown in FIG. 16A is configured by arranging a number of rectangular prisms 21a at intervals of nearly 50 μm in parallel, and is used for magnifying light beams in one direction.

The prism array 22 shown in FIG. 16B has prisms 22a configured by providing inclined surfaces, which are perpendicular to each other, also in the longitudinal direction in each of the prisms 21a of the prism array 21. That is, the prisms 21a are each divided into a number of prisms 22a. The prism array 22 is used for magnifying light beams at different magnifications in two directions that are perpendicular to each other. The prism arrays 21 and 22 are located very close to or in contact with the screen 13 with their flat surfaces facing the screen 13.

In order to enhance the feeling of presence, each of the image display apparatuses 1 to 4 in the respective embodiments provides images not only having parallax but also expressing a wide field of view, i.e., a wide range. In order to enlarge the ranges of the images given to the observer's left and right eyes as much as possible, it is preferable not to make the left and right images express the same range, but to make the left and right images express different ranges including a part common to the both eyes and parts specific to the left or right eye.

Figure 17A:
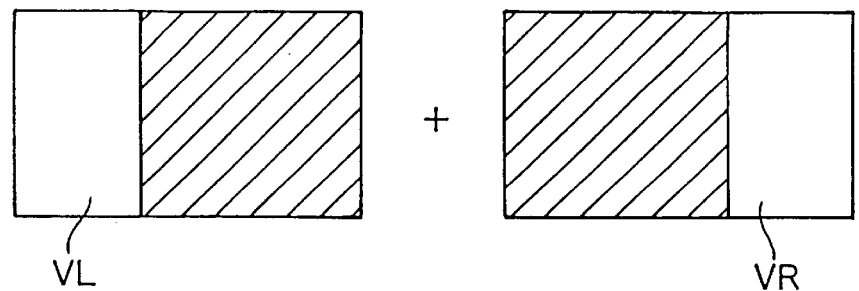
FIGS. 17A and 17B are schematic diagrams showing ranges of left and right images displayed in the image display apparatus of each embodiment and a range recognized by the observer.
Figure 17B:
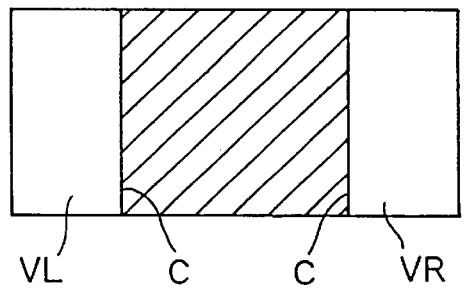

FIGS. 17A and 17B schematically show such setting of ranges expressed by the images. FIG. 17A shows a range VL of the image for the left eye and a range VR of the image for right eye. FIG. 17B shows an entire range of the image that the observer recognizes in his/her brain through visual sense. The shaded area is a range that is common in the image range VL for the left eye and the image range VR for the right eye.

The brightness of the common range in the entire range that the observer recognizes becomes twice as high as that in the residual ranges since the light of the image for the left eye and the light of the image for the right eye is overlapped. In consequence, a large difference in brightness arises between the common range and the residual ranges, and the boundaries C at the left and right edges of the common range are clearly recognized by the observer. Thus, the observer suffers from an uncomfortable feeling.

Figure 18:
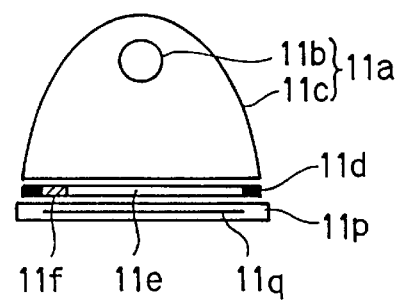
FIG. 18 is a plan view of a transmissive liquid crystal display unit in the image display apparatus of each embodiment.

Each of the image display apparatuses 1 to 4 provides means for avoiding this inconvenience, in the liquid crystal display units 11L and 11R. FIG. 18 shows a plan view of the liquid crystal display unit 11L displaying the image for the left eye. The backlight source 11a is composed of a metal halide lamp 11b and a parabolic reflector 11c. Between the backlight source 11a and the liquid crystal panel 11p is located a shading plate 11d having a rectangular opening 11e corresponding to the display area 11q of the liquid crystal panel 11p.

Figure 19:
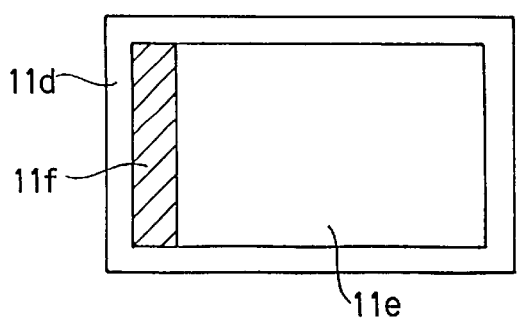
FIG. 19 is a front view of a shading plate provided in the liquid crystal display unit in the image display apparatus of each embodiment.

FIG. 19 shows a front view of the shading plate 11d. A slim ND filter 11f, whose width is about one-eighth of the size of the opening 11e in the horizontal direction, is provided in the vertical direction in an edge (the edge in the side of the liquid crystal display unit 11R displaying the image for the right eye) of the opening 11e of the shading plate 11d. Transmittance of the ND filter 11f is so set as to increase from the frame part of the shading plate 11d toward the opening 11e and is 0% in the frame part side and 100% in the opening side. The liquid crystal display unit 11R displaying the image for the right eye also has similar configuration, and includes an ND filter 11f in the edge of an opening of a shading plate in the side of the liquid crystal display unit 11L.

With the ND filters 11f provided for the liquid crystal display unit 11L and 11R, it is possible to gradually reduce the quantity of light in the edges of the common range of the image for the left eye and the image for the right eye. Therefore, boundaries C shown in FIG. 17B are not recognized clearly. It is possible to locate the shading plate 11d, in which the ND filter 11f is provided, in the opposite side of the backlight source 11a in regard to the liquid crystal panel 11p instead of locating it between the backlight source 11a and the liquid crystal panel 11p. Furthermore, as for this location, it is also possible to replace the ND filter 11f with a shutter film having no transmissivity, and increase the distance between the liquid crystal panel 11p and the shutter film. Though no light passes through the shutter film, the boundaries C become less clear due to a phenomenon that light traveling near the shutter film goes into a space behind the shutter film to some extent.

Figure 20:
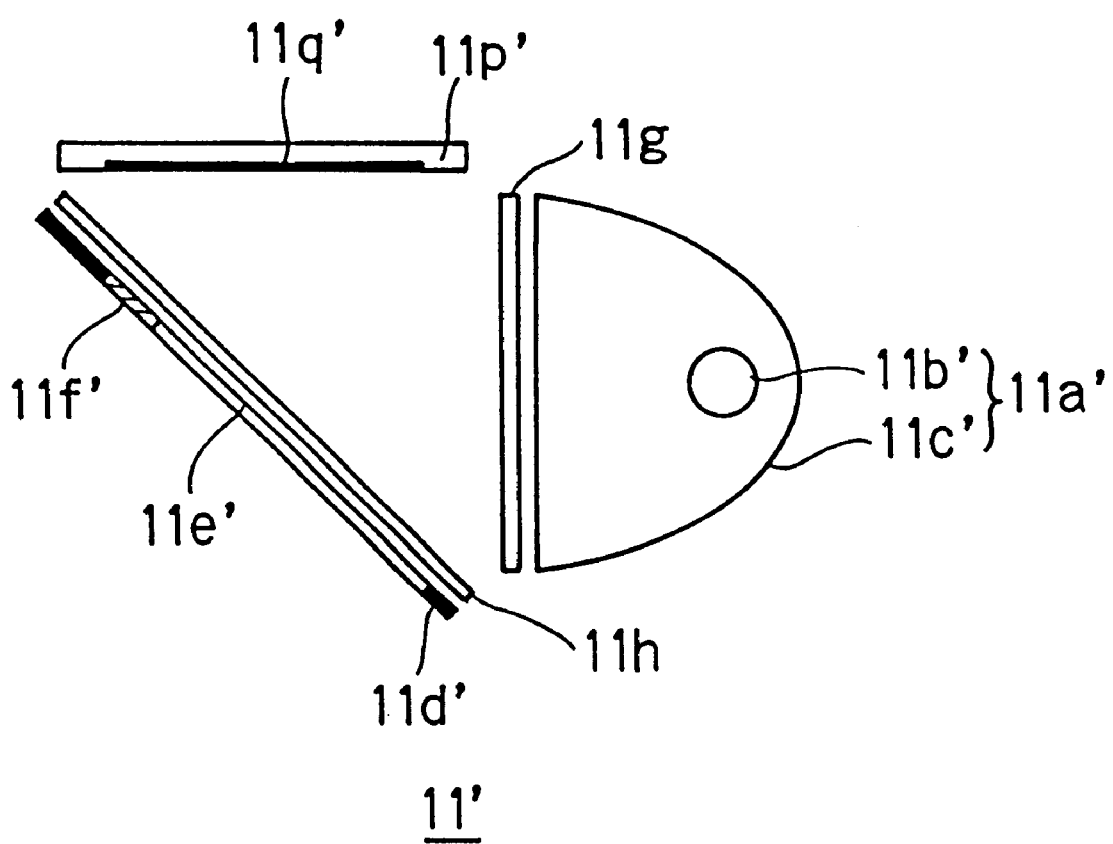
FIG. 20 is a plan view of a reflective liquid crystal display unit substituted in the image display apparatus of each embodiment.

Making the boundaries C unclear by the ND filters 11f is also effective in a configuration where reflective liquid crystal display units are employed instead of the transmissive liquid crystal display units 11L and 11R for displaying images. FIG. 20 shows the configuration for displaying images by the reflective liquid crystal display unit.

The reflective liquid crystal display unit 11' is provided with a light source 11a' composed of a lamp 11b' and a reflector 11c', a reflective liquid crystal panel 11p', a shading plate 11d', a polarizing plate 11g, and a polarized beam splitting (PBS) plate 11h. The light source 11a' is located so that its optical axis is parallel to the liquid crystal panel 11p'. The PBS plate 11h transmits P-polarized light and reflects S-polarized light, and is located with being inclined at 45° against the liquid crystal panel 11p'. The polarizing plate 11g transmits only linearly polarized light that is S-polarized for the PBS plate 11h, and is located between the light source 11a' and the PBS plate 11h.

The shading plate 11d' is similar to the shading plate 11d shown in FIG. 19, and has an opening 11e' corresponding to a display range 11q' of the liquid crystal panel 11p', and an ND filter 11f' provided in its end. The shading plate 11d' is located in parallel to the PBS plate 11h, and in the opposite side of the liquid crystal panel 11p' in regard to the PBS plate 11h.

Non-polarized light from the light source 11a' is made to be linearly polarized light by the polarizing plate 11g, enters the PBS plate 11h as S-polarized light, and is reflected toward the liquid crystal panel 11p'. The light entering the liquid crystal panel 11p' is reflected and modulated according to an image displayed thereon, and becomes light including two components which are P-polarized and S-polarized for the PBS plate 11h. The light from the liquid crystal panel 11p' enters the PBS plate 11h again, and only the P-polarized light passes through the PBS plate 11h and becomes light expressing the image. The light having passed through the PBS plate 11h and expressing the image is reduced for the quantity of light in edges by the ND filter 11f' while passing through the opening 11e' of the shading plate 11d', and reaches a projection optical system not shown.

In each of the image display apparatuses 1 to 4, it is also possible to employ the reflective liquid crystal display unit 11' for displaying images. It is arbitrary which of the transmissive and reflective liquid crystal display units is used.

As described above, in the image display apparatus of the present invention provided with a screen having retro-reflectivity, an image display device, a projection optical system, and a beam magnifier magnifying light beams originating at individual points of the image display device so that magnifications are different in two directions perpendicular to each other, it is easy to set the diameter of the light beams expressing individual points of the image in accordance with the human horizontal and vertical fields of view. Therefore, it is possible to simultaneously prevent both inconveniences of the diameter of the light beams becoming excessively large in the vertical direction and becoming too little in the horizontal direction. As a result, it is possible to provide images that are bright, highly enhanced in quality and free from eclipse. Moreover, this apparatus becomes small since it is unnecessary to use a large projection optical system with a large exit pupil.

In particular, by using a diffracting element separating and magnifying a light beam by diffraction as the beam magnifier, it is easy to set the magnification of the light beams since degree of magnification can be adjusted arbitrarily. Moreover, since distribution of the intensity of the light beams after magnification can also be set arbitrarily, it is possible to make the intensity of the light beams substantially uniform from the central part to the peripheral part within an image, so that the brightness of the image becomes constant regardless of the direction of line of sight.

In addition, in the image display apparatus of the present invention provided with a screen having retro-reflectivity, a pair of image display devices, a pair of projection optical systems, and a beam magnifier magnifying light beam originating at individual points of the image display devices, and fulfilling the relation of Expression (1), it is possible to enhance the three-dimensional effect by giving images having parallax to the left and right eyes. Furthermore, since eclipse and cross-talk are surely prevented from arising in the images, it is possible to provide the enhanced feeling of presence for the observer.

Obviously, many modifications and variations of the present invention are possible in light of the above teachings. It is therefore to be understood that within the scope of the appended claims, the invention may be practiced other than as specifically described.

What is claimed is:

1. An image display apparatus comprising:
 a screen having retro-reflectivity;
 an image display device for displaying an image thereon;
 a projection optical system that projects light from said image display device and forms, on said screen, a magnified image of the image displayed on said image display device; and
 a beam magnifier located between said projection optical system and said screen so as to be close to said screen, said beam magnifier transmitting the light from said projection optical system, and magnifying light beams originating at individual points of said image display device and included in the light from said projection optical system, so that magnifications in two directions perpendicular to each other are different.

2. An image display apparatus as claimed in claim 1, wherein said beam magnifier magnifies the light beams originating at individual points of said image display device in one of the two directions.

3. An image display apparatus as claimed in claim 1, wherein said beam magnifier magnifies the light beams originating at individual points of said image display device in both of the two directions.

4. An image display apparatus as claimed in claim 1, wherein said beam magnifier is a diffracting element separating and magnifying a light beam by diffraction.

5. An image display apparatus as claimed in claim 1, wherein said beam magnifier magnifies the light beams so that a magnification of light beams originating at a peripheral part of said image display device is larger than a magnification of light beams originating at a central part of said image display device.

6. An image display apparatus as claimed in claim 1, further comprising a combiner that directs light from said projection optical system to said screen, and directs light from said screen to an observer's eye.

7. An image display apparatus as claimed in claim 1, further comprising an eyepiece optical system that directs light from said screen to an observer's eye, and supplies the observer with an virtual image of the image formed on said screen.

8. An image display apparatus comprising:
 a screen having retro-reflectivity;
 a pair of image display devices for displaying an image for a left eye and an image for a right eye respectively;

a pair of projection optical systems that project light from said image display devices and form, on said screen, magnified images of the images displayed on said image display devices; and a beam magnifier located between said projection optical systems and said screen so as to be close to said screen, said beam magnifier transmitting the light from said projection optical systems, and magnifying light beams originating at individual points of said image display devices and included in the light from said projection optical systems, wherein a following relation is fulfilled:

$$2 \cdot r \cdot \sin(\theta/2) \leq D \leq 2 \cdot \{W - r \sin(\theta/2)\}$$

in which r is a distance between centers of rotation and pupils of observer's left and right eyes, $\theta$ is an observer's horizontal viewing angle, W is a distance between the left and right eyes, and D is a width of the light beams originating at individual points of said image display devices at the left and right eyes in a direction parallel to a line connecting the left and right eyes.

9. An image display apparatus as claimed in claim 8, wherein said beam magnifier magnifies the light beams so that a magnification of light beams originating at peripheral parts of said image display devices is larger than a magnification of light beams originating at central parts of said image display devices.

10. An image display apparatus as claimed in claim 8, further comprising a combiner that directs light from said projection optical systems to said screen, and directs light from said screen to observer's eyes.

11. An image display apparatus as claimed in claim 8, further comprising a pair of eyepiece optical systems that direct light from said screen to observer's eyes, and supply the observer with virtual images of the images formed on said screen.

* * * * *